United States Patent [19]

Atobe

[11] Patent Number: 4,790,492
[45] Date of Patent: Dec. 13, 1988

[54] REVOLUTION SENSOR FOR A SPOOL ON A FISHING REEL

[75] Inventor: Takashi Atobe, Tokyo, Japan

[73] Assignee: Daiwa Seiko, Inc., Tokyo, Japan

[21] Appl. No.: 32,966

[22] Filed: Apr. 1, 1987

Related U.S. Application Data

[63] Continuation of Ser. No. 752,849, Jul. 8, 1985, abandoned.

[30] Foreign Application Priority Data

Jul. 20, 1984 [JP] Japan ............ 59-109880[U]

[51] Int. Cl.⁴ .................................................. A01K 85/15
[52] U.S. Cl. ................................... 242/84.1 M; 33/129
[58] Field of Search ............... 242/84.1 M, 84.1 R, 242/84.52 B; 33/129, 130, 131, 132; 43/21

[56] References Cited

U.S. PATENT DOCUMENTS

| | | | |
|---|---|---|---|
| 2,746,691 | 5/1956 | Hoad | 242/84.52 B |
| 4,378,652 | 4/1983 | Lindgren | 242/84.1 M |
| 4,438,391 | 3/1984 | Rog et al. | 324/71.1 |
| 4,549,703 | 10/1985 | Atobe | 242/84.52 B |
| 4,585,182 | 4/1986 | Atobe | 242/84.1 M |
| 4,620,371 | 11/1986 | Murakami | 242/84.1 M |
| 4,697,758 | 10/1987 | Hirose | 242/84.1 M |

FOREIGN PATENT DOCUMENTS

| | | | |
|---|---|---|---|
| 448537 | 5/1948 | Canada | 242/84.52 B |
| 56-48839 | 5/1981 | Japan . | |
| 56-175075 | 12/1981 | Japan | 242/84.52 B |
| 57-15847 | 4/1982 | Japan | 242/84.1 R |
| 60-121758 | 8/1985 | Japan . | |

Primary Examiner—Stanley N. Gilreath
Assistant Examiner—Katherine Matecki
Attorney, Agent, or Firm—Kalish & Gilster

[57] ABSTRACT

A revolution sensor device for a spool on a reel for the purpose of causing the spool to rotate at a uniform rate for obviating vibrations and audible resonance, as well as being productive of longevity of operation of the spool; said sensor comprising a magnet mounted on the spool for rotation therewith, magnetic coacting devices fixed on the spool, and with suitable counter-weighting of the magnet upon the spool.

3 Claims, 2 Drawing Sheets

REVOLUTION SENSOR FOR A SPOOL ON A FISHING REEL

This application is a continuation of Ser. No. 752,849, filed July 8, 1985, and now abandoned.

BACKGROUND AND SUMMARY OF THE INVENTION

The present invention relates to a device for detecting the rotation of a spool on a fishing reel and, more particularly, to improvements in a spool revolution sensing device incorporating a magnet and Hall effect devices.

In recent years, a device has been available that can measure and display the length of the paid out portion of a fishing line on a fishing reel, such as a casting reel, while the line is being cast, as well as the length of the wound portion of the line after the line is cast. Such device incorporates a sensor for detecting the revolutions of the spool, a microcomputer for calculating the length of the paid out and/or wound portion from the number of revolutions of tee spool sensed by the sensor, and an LCD display unit for the result of the calculation. Examples of this type of device are disclosed in published Japanese Patent Specification No. 48839/1981 and Japanese Utility Model Application No. 8693/1984, each of which were filed by the present applicant.

In fishing reels incorporating such devices, the sensor for detecting spool revolution is an important component. The sensor disclosed in the aforementioned published Patent Specification No. 48839/1981 comprises a stationarily mounted reed switch and a cooperating magnet carried on a rotatable member. The sensor disclosed in the aforementioned Utility Model Application No. 8693/1984 comprises a magnet carried on the reel spool and fixedly mounted co-acting Hall effect devices.

Usually magnets for activating the reed switch or Hall effect devices are located at a position remote from the axis of rotation of the rotating body, such as a spool. Such magnets are of relatively large size to assure effective contact with the reed switch or Hall effect devices for accurate operation. For these reasons, the circumferential weight distribution of the rotating body is unbalanced, causing the rate of rotation to be nonuniform. This is especially true with a magnet mounted on a spool for use with a casting reel, when the rate of rotation of the spool may reach a frequency of 10,000 rpm, or more, when the fishing line is cast. At the present time, the nonuniform rotation of the spool causes the spool and the body of the reel to vibrate, which may produce audible resonance or abnormal sounds. Further, the distance that can be traveled by the fishing tackle is reduced.

It is a primary object of the present invention to provide a device which senses the revolutions of a spool for use with a fishing reel and wherein the spool will be caused to revolve at a uniform rate. It is another object of the present invention to provide a sensing device of the character stated incorporating a magnet located upon the spool and with means for balancing the weight of the magnet so that the circumferential weight distribution of the spool is balanced and thereby permitting uniform rotation and with avoidance of vibration.

It is another object of the present invention to provide a sensing device of the character stated which may be economically produced; and which is extremely durable and reliable in usage.

The foregoing objects are achieved by a device which senses the revolution of a fishing reel mounted spool wherein the sensor is composed of a magnet mounted on one side of the spool for rotation therewith and cooperating members carried on a stationary section in opposed relation to the magnet, and with the spool being provided with one or more members such that the weight of the magnet is balanced to effect proper weight distribution of the spool in order to produce a uniform rate of rotation during operation, obviating the likelihood of vibrations and audible resonance.

DESCRIPTION OF THE PREFERRED EMBODIMENTS

Figure 1:
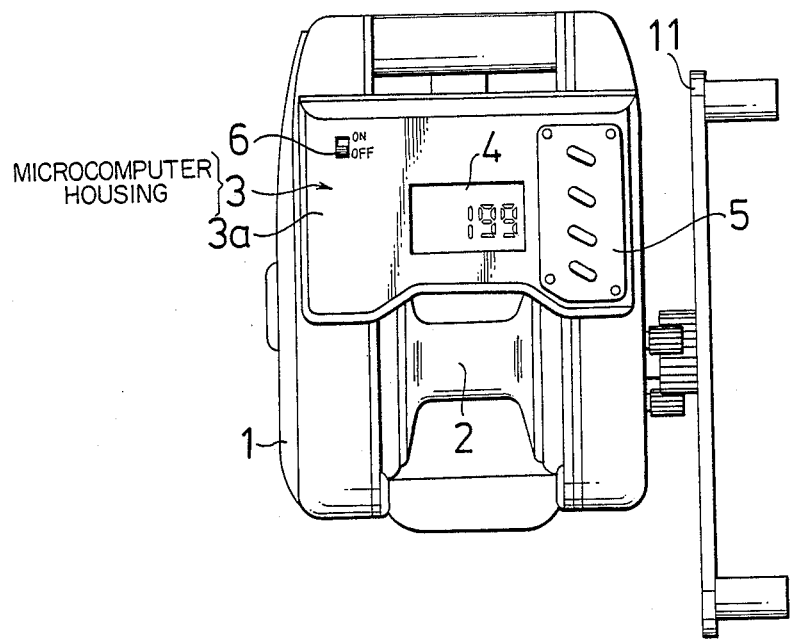
FIG. 1 is a plan view of a fishing reel incorporating a spool revolution sensing device made in accordance with and embodying the present invention.
Figure 2:
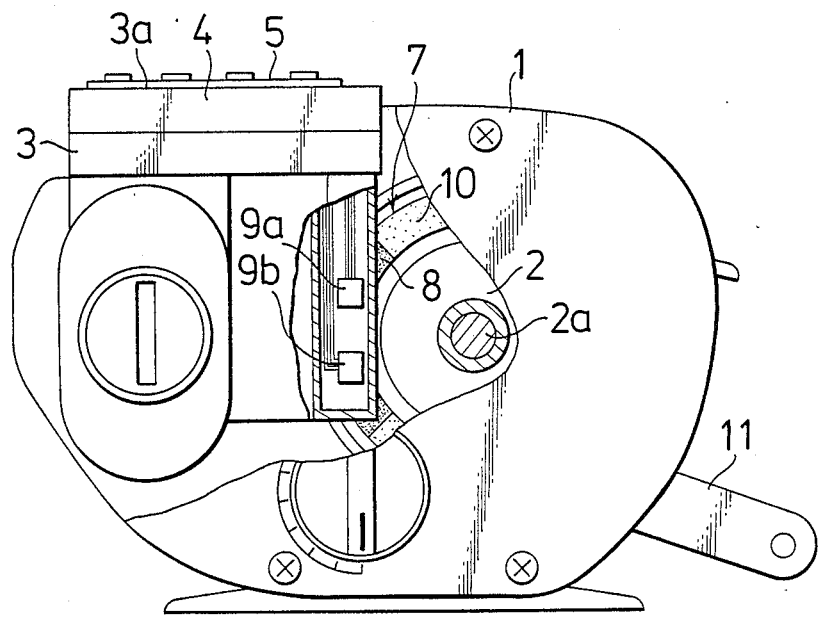
FIG. 2 is a side elevational view taken on the left hand side of FIG. 1 and being partially cut away.

Referring now by reference characters to FIGS. 1-4, inclusive, of the drawings, such illustrate one of the preferred embodiments of the present invention. A fishing reel body is indicated at 1 having a spool shaft 2a adapted for rotation and carrying a spool 2. A fishing line (not shown) is wound on spool 2 and a water-proof housing 3 is integrally disposed upon body 1.

Figure 3:
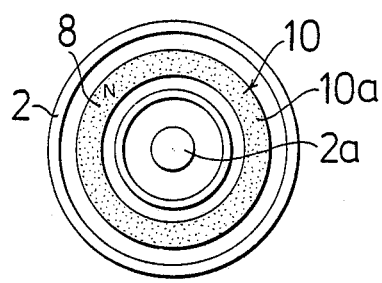
FIG. 3 is a side elevational view of the spool illustrating the structure for balancing the magnet carried thereon.
Figure 4:
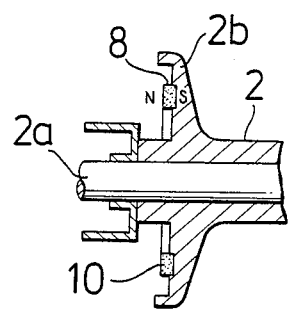
FIG. 4 is a fragmentary vertical cross-sectional view taken from FIG. 3, illustrating the shaft in full lines.

Housing 3 contains a control panel 3a on its upper surface. Installed on the panel 3a are a display unit 4, as of the LCD type, a keyboard 5, and a power switch 6. Incorporated in housing 3 are a microcomputer for calculating the length of the paid out and/or wound portion of the line; and a suitable power supply, such as a battery, etc. (all of which are not shown). A sensor 7 acts to detect the revolution of spool 2, and comprises a magnet 8 and co-acting Hall effect devices 9a and 9b. Magnet 8 is firmly fixed on one side of the jaw 2b of spool 2. Hall effect devices 9a, 9b are fixedly disposed in housing 3 in opposed relation to magnet 8. As shown in FIGS. 3 and 4, an annular magnetic member 10 is mounted on the proximate side surface of spool 2 and coaxial therewith. A section, for example, within a range of 90° to 120°, of member 10 is magnetized to form magnet 8, which thus constitutes a finite integral portion of said member 10. The remaining or non-magnetized portion 10a of member 10 serves to cause the circumferential distribution of the weight of spool 2 to be uniform. Magnet 8 is so magnetized that, as shown in FIG. 4, the surface opposed to Hall effect devices 9a, 9b is polarized north and the surface thereof which is attached to spool 2 is polarized south. A handle 11 is used to rotate spool 2 when the fishing line is to be rewound.

In the operation of the device, constructed as described above, when spool 2 is rotated in a direction to pay out or wind up the line, the magnetic field produced by magnet 8, acts upon Hall effect devices 9a, 9b each, time the spool makes a revolution. As a result, a pulse-form voltage is generated across devices 9a, 9b which is applied to the microcomputer for sensing the direction of rotation of spool 2. At the same time, such voltages produced one after another are counted, and the microcomputer calculates the length of the line from the obtained total count. Then, the calculated length is visually displayed on display unit 4. Since magnet 8 constitutes a partially magnetized portion of annular magnetic member 10, the circumferential distribution of the weight of spool 2 is uniform. Therefore, even if spool 2 turns at a relatively high rate of speed, the rate of revolutions is maintained in a uniform, stable, and smooth state. Consequently, generation of audible resonance or abnormal sound is prevented. In addition, the distance that the fishing tackle can travel can be increased.

Figure 5:
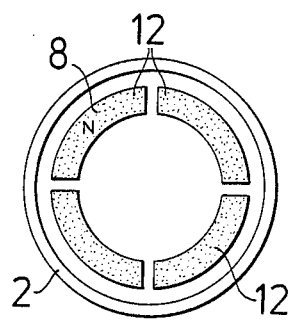
FIG. 5 is a side elevational view of a spool having provided thereon another form of structure for balancing the associated magnet, such structure being constructed in accordance with and embodying the present invention.

FIG. 5 illustrates another form of spool revolution sensing device embodying the present invention. It will be seen that a plurality of (four) arcuate members 12 of identical mass are disposed annularly and coaxially so as to render the weight distribution circumferentially uniform. It will be seen that said members 12 are of substantially like extent and may be arranged to cause a uniform spacing between adjacent members. One of said members 12 as indicated at 8 is magnetized to form the magnet of sensor 7. The other or remaining members 12 thus serve as balancing members.

In this form of the invention, the magnetized member 8 of sensor 7 may be shaped in a facile manner into any desired form, but the arcuate type illustrated has proved very effective. Further, this form of the invention yields the same advantages as the arrangement described hereinabove in conjunction with the form of the invention illustrated in FIG. 3.

In the form shown in FIG. 5, the remaining members 12 may be capable of being magnetized if desired or may be constructed of non-magnetic material. It is not necessary to shape same into any particular form, although the arcuate form illustrated is desired.

In the above description, the magnet is mounted on one side surface of the spool, but may be installed at any desired position upon the related side portion of the spool. Thus, for example, it may be mounted on the outer periphery of the spool side surface.

From the foregoing, it will be seen that, in accordance with the present invention, one or more members are mounted on the spool so that the same are circumferentially balanced with respect to the weight of the magnet which latter is firmly secured to the spool side and constitutes a critical element of the sensor for detecting spool revolutions. The weight so balanced is thus stabilized in the direction of rotation of spool, which latter may rotate smoothly without producing audible resonance or abnormal sound. Further, the magnet can be readily employed to detect the rotation of the spool.

Also, according to this invention, one or more members are mounted on the spool so that the weight of the magnet forming the subject rotation-detecting sensor is circumferentially balanced thereby. Such stabilizes the weight in the direction of rotation of spool, and assures that the spool will rotate smoothly. Hence, the novel structure of this invention completely eliminates serious problems encountered with current fishing reels. Specifically, where a fishing line engaging a lure is used, when the spool is paid out at a relatively high rate of speed for releasing the line, the spool is required to rotate quite uniformly. If it rotates even slightly nonuniformly, the rapid rate of rotation gives rise to abnormal sound or audible resonance, adversely affecting the casting operation. In addition, the abrasion of the bearing of the spool is greatly accelerated, and thereby ultimately impeding the function of the reel. Furthermore, the magnet can readily be used for detection of spool rotation.

What is claimed is:

1. A fishing reel for casting comprising a body and a spool rotatably carried by the body, a microcomputer for calculating the length of fishing line paid out or wound up by the spool, means for displaying the length so calculated, and a device for detecting rotation of the spool, including a rotation sensor for sensing rotation of the spool, the rotation sensor comprising annular magnet means carried by the spool, the magnet means being an annularly shaped member made from magnetic material extending concentrically around the axis of rotation of the spool coaxial to the spool and carried on a side of the spool, at least one finite, integrally formed, arcuate portion of the annularly shaped member magnetized to produce a magnetic field, the annularly shaped member including a remaining, non-magnetized arcuate portion serving to cause the circumferential distribution of the weight of the spool to be uniform, and a fixed magnetic field detecting device disposed opposite to the annularly shaped member for responding to the magnetic field produced by the arcuate integrally formed portion of the annnularly shaped member upon rotation of the magnet means to provide sensing of each rotation of the spool for developing a pulse-form voltage for counting and calculation by the microcomputer of the length of the line so pad out and wound up by the spool, whereby rotation of the spool is maintained even at a relatively high rate of speed in a uniform, stable and smooth state without resonance or abnormal sound and casting distance is increased.

2. A fishing reel according to claim 1, wherein the magnetic field detecting device is constituted by a Hall effect device.

3. A fishing reel according to claim 1 wherein the annularly shaped member is carried on a side surface of the spool.

* * * * *